United States Patent

Goldstein

[19]

[11] Patent Number: 5,963,642
[45] Date of Patent: Oct. 5, 1999

[54] METHOD AND APPARATUS FOR SECURE STORAGE OF DATA

[76] Inventor: Benjamin D. Goldstein, 414 Union Ave., Mamaroneck, N.Y. 10543

[21] Appl. No.: 08/777,414

[22] Filed: Dec. 30, 1996

[51] Int. Cl.⁶ ...................................................... H04L 9/00
[52] U.S. Cl. ..................................... 380/4; 380/9; 380/23; 380/25; 380/28; 380/49; 380/50; 707/1
[58] Field of Search ............................... 380/4, 9, 23, 25, 380/28, 49, 50, 59; 707/1, 100, 101, 102, 103, 104

[56] References Cited

U.S. PATENT DOCUMENTS

| | | | |
|---|---|---|---|
| 4,974,191 | 11/1990 | Amirghodsi et al. | 380/50 X |
| 5,065,429 | 11/1991 | Lang | 380/25 |
| 5,191,611 | 3/1993 | Lang | 380/25 |
| 5,367,573 | 11/1994 | Quimby | 380/25 |
| 5,659,614 | 8/1997 | Bailey, III | 380/4 |

*Primary Examiner*—Bernarr E. Gregory
*Attorney, Agent, or Firm*—Ansel M. Schwartz

[57] ABSTRACT

A mechanism and method for encrypting database information such that the data can be directly processed while still in an encrypted form. The mechanism and method make use of a distributed computing network. Internal level database information is located remotely from users in the form of property-oriented positional q-code suitable for directly performing database operations on. End-user workstations have external level or conceptual level information. End-user workstations make use of codebooks to decrypt the internal level database information which is located separately from the codebooks. External-level (user-level) and/or conceptual-level (community-level) schema information is located on end-user workstations (or accessible from them), while internal-level data in the form of compressed binary sparse matrices is located separately. The internal-level data is in effect encrypted as a positional q-code. The end-user workstations have codebooks (or access to codebooks) which along with the external-level and/or conceptual level schema information allow the encrypted internal-level database information to be locally decrypted.

16 Claims, 11 Drawing Sheets

CONSULTANTS (NAME,RATE,SKILLS,DAYS)

| NAME | RATE | SKILLS | DAYS |
|---|---|---|---|
| DANNY | $45/HR. | LOTUS | MTWHF |
| DANNY | $45/HR. | DBASE | MTWHF |
| DANNY | $45/HR. | QUARK | MTWHF |
| LYNN | $55/HR. | ORACLE | TWH |
| LYNN | $55/HR. | SYBASE | TWH |
| MARK | $18/HR. | WP | MWF |

*FIG.1A*

DECOMPOSITION OF CONSULTANTS RELATION

| NAME | RATE |
|---|---|
| DANNY | $45/HR. |
| LYNN | $55/HR. |
| MARK | $18/HR. |

| NAME | SKILLS |
|---|---|
| DANNY | LOTUS |
| DANNY | DBASE |
| DANNY | QUARK |
| LYNN | ORACLE |
| LYNN | SYBASE |
| MARK | WP |

| NAME | DAYS |
|---|---|
| DANNY | M |
| DANNY | T |
| DANNY | W |
| DANNY | H |
| DANNY | F |
| LYNN | T |
| LYNN | W |
| LYNN | H |
| MARK | W |
| MARK | W |
| MARK | F |

C RATE(NAME,RATE),C SKILLS(NAME,SKILLS),C DAYS(NAME,DAYS)

*FIG.1B*

CONSULTANTS(NAME,RATE,SKILLS,DAYS)

| DANNY | LYNN | MARK | 18 | 45 | 55 | LOTUS | DBASE | QUARK | ORACLE | SYBASE | WP | M | T | W | H | F |
|---|---|---|---|---|---|---|---|---|---|---|---|---|---|---|---|---|
| 1 | 0 | 0 | 0 | 1 | 0 | 1 | 1 | 1 | 0 | 0 | 0 | 1 | 1 | 1 | 1 | 1 |
| 0 | 1 | 0 | 0 | 0 | 1 | 0 | 0 | 0 | 1 | 1 | 0 | 0 | 1 | 1 | 1 | 0 |
| 0 | 0 | 1 | 1 | 0 | 0 | 0 | 0 | 0 | 0 | 0 | 1 | 1 | 0 | 1 | 0 | 1 |

*FIG.1C*

$$A = \begin{matrix} 8 & 0 & 0 & 1 & 0 \\ 0 & 0 & 5 & 0 & 12 \\ 0 & 0 & 0 & 7 & 0 \\ 0 & 3 & 0 & 0 & 0 \end{matrix}$$

| BIT MAP SCHEME | SINGLE INDEX SCHEME | DOUBLE INDEX SCHEME |
|---|---|---|
| DIM(4,5)<br>$S_B$ = 10010001010001001000<br>V = [8,1,5,12,7,3] | DIM(4,5)<br>$V_1$= [1,4,8,10,14,17]<br>$V_2$= [8,1,5,12,7,3] | DIM(4,5)<br>$V_1$= [1,4,3,5,4,2, Δ]<br>$V_2$= [1,3,5,6,7]<br>$V_3$= [8,1,5,12,7,3] |

AN EXAMPLE OF THREE SPARSE MATRIX COMPRESSION SCHEMES

*FIG.2*

BINARY PROPERTY MATRIX (BPM)         QUERY VECTOR TRANSPOSED         RESPONSE MATRIX $$
\begin{pmatrix}
1 & 0 & 0 & 0 & 0 & 1 & 0 & 0 \\
0 & 1 & 0 & 0 & 0 & 1 & 1 & 0 \\
0 & 0 & 0 & 1 & 0 & 1 & 0 & 1 \\
1 & 0 & 0 & 1 & 0 & 0 & 0 & 0 \\
1 & 0 & 0 & 0 & 0 & 0 & 0 & 0 \\
0 & 0 & 1 & 1 & 1 & 1 & 0 & 1 \\
1 & 0 & 0 & 0 & 0 & 0 & 1 & 0 \\
\end{pmatrix}
\times
\begin{pmatrix}
0 \\ 1 \\ 0 \\ 0 \\ 0 \\ 1 \\ 0 \\ 0 \\
\end{pmatrix}
=
\begin{pmatrix}
1 \\ 1 \\ 2 \text{ MATCH} \\ 2 \text{ MATCH} \\ 0 \\ 2 \text{ MATCH} \\ 1 \\
\end{pmatrix}
$$

AN EXAMPLE OF A SIMPLE QUERY

*FIG. 3*

BPM
CUST(NAME,STREET,CITY,STATE)

| LYNN | MARK | BILL | SAM | LIZA | CARL | 5 OAK | 6 GUNN | 2 PINE | 8 MAIN | 4 MAIN | NYACK | UNION | DERBY | RENO | BUTTE | NY | NJ | CT | NV | MT |
|---|---|---|---|---|---|---|---|---|---|---|---|---|---|---|---|---|---|---|---|---|
| 1 | 0 | 0 | 0 | 0 | 0 | 1 | 0 | 0 | 0 | 0 | 1 | 0 | 0 | 0 | 0 | 1 | 0 | 0 | 0 | 0 |
| 0 | 0 | 0 | 1 | 0 | 0 | 0 | 0 | 0 | 0 | 1 | 0 | 1 | 0 | 0 | 0 | 0 | 0 | 0 | 1 | 0 |
| 0 | 1 | 0 | 0 | 0 | 0 | 0 | 0 | 0 | 1 | 0 | 0 | 0 | 1 | 0 | 0 | 0 | 0 | 1 | 0 | 0 |
| 0 | 0 | 0 | 0 | 1 | 0 | 0 | 1 | 0 | 0 | 0 | 0 | 0 | 0 | 1 | 0 | 0 | 0 | 0 | 0 | 1 |
| 0 | 0 | 1 | 0 | 0 | 0 | 0 | 0 | 1 | 0 | 0 | 0 | 0 | 0 | 1 | 0 | 0 | 1 | 0 | 0 | 0 |
| 0 | 0 | 0 | 0 | 0 | 1 | 1 | 0 | 0 | 0 | 0 | 1 | 0 | 0 | 0 | 0 | 1 | 0 | 0 | 0 | 0 |

QUERY VECTOR (QV)

SELECT * FROM CUST WHERE STATE IN ('NY', 'NJ', 'CT') :

| LYNN | MARK | BILL | SAM | LIZA | CARL | 5 OAK | 6 GUNN | 2 PINE | 8 MAIN | 4 MAIN | NYACK | UNION | DERBY | RENO | BUTTE | NY | NJ | CT | NV | MT |
|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 1 | 1 | 1 | 0 | 0 |

RESPONSE MATRIX

CUST BPM X TRANSPOSE(QV) =  
1 MATCH  
0  
1 MATCH  
0  
1 MATCH  
1 MATCH

AN EXAMPLE OF A RANGE QUERY

*FIG.4*

BPM 7A

SALES REP (NAME, STREET, CITY, STATE)

| TED | JANE | MARK | 8 MILL | 6 ELM | 5 POST | NYACK | RENO | DERBY | NY | NV | VA |
|---|---|---|---|---|---|---|---|---|---|---|---|
| 1 | 0 | 0 | 1 | 0 | 0 | 1 | 0 | 0 | 1 | 0 | 0 |
| 0 | 1 | 0 | 0 | 1 | 0 | 0 | 1 | 0 | 0 | 1 | 0 |
| 0 | 0 | 1 | 0 | 0 | 1 | 0 | 0 | 1 | 0 | 0 | 1 |

FIG. 7A

BPM 7B

SALES REP (NAME, STREET, CITY, STATE)

| LYNN | MARK | BILL | SAM | LIZA | CARL | 5 OAK | 6 GUNN | 2 PINE | 8 MAIN | 4 MAIN | NYACK | UNION | DERBY | RENO | BUTTE | NY | NJ | CT | NV | MT | TED | JANE | 8 MILL | 6 ELM | 5 POST | VA |
|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 1 | 0 | 0 | 0 | 0 | 1 | 0 | 0 | 0 | 0 | 1 | 0 | 1 | 0 | 0 | 0 |
| 0 | 0 | 0 | 0 | 0 | 0 | 0 | 0 | 0 | 0 | 0 | 0 | 0 | 1 | 0 | 0 | 0 | 0 | 1 | 0 | 0 | 1 | 0 | 1 | 0 | 0 | 0 |
| 0 | 1 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 1 | 1 |

FIG. 7B

BPM 7C $\Pi_{STATE}$ (SALES REP (NAME, STREET, CITY, STATE))

| LYNN | MARK | BILL | SAM | LIZA | CARL | 5 OAK | 6 GUNN | 2 PINE | 8 MAIN | 4 MAIN | NYACK | UNION | DERBY | RENO | BUTTE | NY | NJ | CT | NV | MT | TED | JANE | 8 MILL | 6 ELM | 5 POST | VA |
|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |

FIG. 7C

BPM 7D

TRANSPOSE ( $\Pi_{STATE}$ (SALES REP (NAME, STREET, CITY, STATE)))

| | | | |
|---|---|---|---|
| LYNN | 0 | 0 | 0 |
| MARK | 0 | 0 | 0 |
| BILL | 0 | 0 | 0 |
| SAM | 0 | 0 | 0 |
| LIZA | 0 | 0 | 0 |
| CARL | 0 | 0 | 0 |
| 5 OAK | 0 | 0 | 0 |
| 6 GUNN | 0 | 0 | 0 |
| 2 PINE | 0 | 0 | 0 |
| 8 MAIN | 0 | 0 | 0 |
| 4 MAIN | 0 | 0 | 0 |
| NYACK | 0 | 0 | 0 |
| UNION | 0 | 0 | 0 |
| DERBY | 0 | 0 | 0 |
| RENO | 0 | 0 | 0 |
| BUTTE | 0 | 0 | 0 |
| NY | 1 | 0 | 0 |
| NJ | 0 | 0 | 0 |
| CT | 0 | 0 | 0 |
| NV | 0 | 1 | 0 |
| MT | 0 | 0 | 0 |
| TED | 0 | 0 | 0 |
| JANE | 0 | 0 | 0 |
| 8 MILL | 0 | 0 | 0 |
| 6 ELM | 0 | 0 | 0 |
| 5 POST | 0 | 0 | 0 |
| VA | 0 | 0 | 1 |

*FIG. 7D*

BPM₈

CUST (NAME, STREET, CITY, STATE)

| LYNN | MARK | BILL | SAM | LIZA | CARL | 5 OAK | 6 GUNN | 2 PINE | 8 MAIN | 4 MAIN | NYACK | UNION | DERBY | RENO | BUTTE | NY | NJ | CT | NV | MT | TED | JANE | 8 MILL | 6 ELM | 5 POST | VA |
|---|---|---|---|---|---|---|---|---|---|---|---|---|---|---|---|---|---|---|---|---|---|---|---|---|---|---|
| 1 | 0 | 0 | 0 | 0 | 0 | 1 | 0 | 0 | 0 | 0 | 1 | 0 | 0 | 0 | 1 | 0 | 0 | 0 | 0 | 0 | 0 | 0 | 0 | 0 | 0 | 0 |
| 0 | 0 | 0 | 1 | 0 | 0 | 0 | 0 | 0 | 1 | 0 | 1 | 0 | 0 | 0 | 0 | 0 | 1 | 0 | 0 | 0 | 0 | 0 | 0 | 0 | 0 | 0 |
| 0 | 1 | 0 | 0 | 0 | 0 | 0 | 0 | 1 | 0 | 0 | 0 | 1 | 0 | 0 | 0 | 1 | 0 | 0 | 0 | 0 | 0 | 0 | 0 | 0 | 0 | 0 |
| 0 | 0 | 0 | 0 | 1 | 0 | 0 | 1 | 0 | 0 | 0 | 0 | 0 | 0 | 1 | 0 | 0 | 0 | 1 | 0 | 0 | 0 | 0 | 0 | 0 | 0 | 0 |
| 0 | 0 | 1 | 0 | 0 | 0 | 0 | 0 | 1 | 0 | 0 | 0 | 0 | 1 | 0 | 0 | 1 | 0 | 0 | 0 | 0 | 0 | 0 | 0 | 0 | 0 | 0 |
| 0 | 0 | 0 | 0 | 0 | 1 | 1 | 0 | 0 | 0 | 0 | 1 | 0 | 0 | 0 | 1 | 0 | 0 | 0 | 0 | 0 | 0 | 0 | 0 | 0 | 0 | 0 |

FIG.8

BPM₉

RESPONSE MATRIX $$BPM_8 \ \ X \ \ BPM_{7D} \ = \ \begin{matrix} 1 & 0 & 0 \\ 0 & 1 & 0 \\ 0 & 0 & 0 \\ 0 & 0 & 0 \\ 0 & 0 & 0 \\ 1 & 0 & 0 \end{matrix}$$

ORDERING OF THE COORDINATES
OF A 5 X 8 MATRIX
UNDER THE SINGLE INDEX
COMPRESSION SCHEME $$A = \begin{matrix} 0&0&0&1&0&0&1&0 \\ 0&0&1&0&1&0&0&0 \\ 0&1&0&0&0&1&0&0 \\ 1&0&0&0&0&0&0&1 \\ 1&0&0&0&1&0&0&0 \end{matrix}$$

SINGLE INDEX SCHEME

DIM (5, 8)

V = [4, 7, 11, 13, 18, 22, 25, 32, 33, 37]

METHOD AND APPARATUS FOR SECURE STORAGE OF DATA

FIELD OF THE INVENTION

The present invention relates to the secure storage of data. More specifically, the present invention relates to the secure storage of semantically encrypted data without requiring decryption of the data.

BACKGROUND OF THE INVENTION

Database systems are often required to maintain the confidentiality or secrecy of various sets of data held on them such that only authorized groups of users or individual users are able to access and manipulate them. This requirement is typically handled through the use of authorization controls. Audit trails are also kept, which in theory at least, keep track of what information individual users access and when the accesses are made. Amongst other purposes, audit trails are intended to provide accountability for the accesses and operations performed on data held on a database system; thereby serving as a deterrent to the improper access and manipulation of data held on the system. While the use of access controls and audit trails are useful and prudent mechanisms for supporting the maintenance of confidentiality on a database system, database systems using these methods still remain vulnerable to breaches of confidentiality. One fundamental area of vulnerability that remains is from systems support personnel. Authorization controls typically grant systems managers, database administrators, and even computer operators who perform backups, full access to data. Personnel with systems privileges can also turn off audit trails and erase or otherwise alter audit trail records. Systems support personnel have special access to database information because it is required in order for them to effectively do their jobs given the limitations of the current technology, the principle limitation being the absence of effective and efficient cryptographic security for the data in current database systems. Furthermore, it should be noted that when access controls are circumvented, e.g., by a computer hacker, once again the lack of cryptographic protection on a database puts the confidentiality of the data at risk.

Difficulties With Existing Methods

It is widely recognized that the use of existing cryptographic techniques to provide improved database security impacts on database performance. Strong enciphering techniques alter the structure of the data in a database so that many types of query operations and other DML (database manipulation language) operations are severely impacted because data must first be deciphered in order for database operations to be performed. Furthermore, the deciphering of the data for processing as required by existing cryptographic techniques exposes the information in plaintext form.

A number of characteristics distinguish database cryptography from communications cryptography. The differences between database cryptography and communications cryptography have been discussed in many places including [Gudes, E. "The Application of Cryptography to Data Base Security." *Ph.D. Dissertation*, Ohio State University, 1976] [Gudes, E., H. S. Koch, and F. A. Stahl. "The Application of Cryptography for Data Base Security." In *Proceedings of the National Computer Conference*, AFIPS Press, 1976, pp. 97–107] [Seberry J. And J. Pieprzyk. "Cryptography: An Introduction to Computer Security." New York: Prentice-Hall, 1989, pp. 233–259]. These references are herein incorporated as background to the current invention. Databases are typically designed so that multiple users can access, query and manipulate a shared store of data. The users are typically given different access rights to the various types of information stored. This emphasis on a shared store of data with an assortment of access rights is quite distinct from the usual concerns that exist for simple communications issues where communicating parties are generally not concerned with performing operations on a common shared store of data.

Databases generally allow for their records to be transformed both selectively and unpredictably. This characteristic puts an added constraint on the types of cryptographic transformations that can be effectively applied with databases when compared with those which may be applied to communications where the concern is not the manipulation of messages, but rather simply their transmission. The requirements of database cryptography are also clearly more difficult to satisfy than the straightforward requirements of file encryption.

In most databases the use of indexing is crucial to obtaining adequate performance for query operations. No general techniques are known for effectively using indexes to access database information while the indexes remain in encrypted form. As a consequence, indexes must be in unencrypted form in order to be used.

A Database Encryption Framework

Gudes [Gudes, E. "The Application of Cryptography to Data Base Security." *Ph.D. Dissertation*, Ohio State University, 1976] and Gudes, Koch and Stahl [Gudes, E., H. S. Koch, and F. A. Stahl. "The Application of Cryptography for Data Base Security." In *Proceedings of the National Computer Conference*, AFIPS Press, 1976, pp. 97–107] identify three fundamental constraints on database cryptography that distinguish it from communications cryptography. These constraints place strict limitations on the types of cryptographic transformations that can be effectively applied to a database. First, it must be possible to selectively and efficiently retrieve data. Because the data in a database is organized to facilitate this, it is most desirable that the encryption and decryption of individual records not involve other records as well. Second, data often remains in a database for an extended period of time. If the data is encrypted, then changing a key requires reprocessing the data encrypted with the key. Third, there is "the processing problem." It would be most advantageous if database operations could be performed directly on encrypted data, i.e., if encrypted data could be processed in the same manner as plaintext data. Not only would this eliminate the overhead that is involved in encrypting and decrypting the plaintext data, but it would be more secure as well, since it would not involve having the data exist in plaintext form at any point of the processing cycle where it might be compromised.

Gudes and Gudes, Koch and Stahl point out that a multi-level model is the most appropriate model to use for addressing the subject of database cryptography. Databases are recognized to have multiple levels, i.e., the data is organized such that it exists in multiple data structures, or can be viewed in this manner, and there are mappings between the different levels. The mappings, in fact, define data transformations and because these data transformations are a natural feature of database design they can be exploited and augmented to provide cryptographic security. Their analysis examines the various types of enciphering methods that are possible between the adjacent levels of a multi-level database architecture. Gudes et al. define their own multi-level database architecture having several physical and logical levels. Their multi-level database architecture is used to highlight the cryptographic potentialities that exist between different levels in a database. They emphasize the fact that the data in a database resides in different forms on the various physical media of a system (disks, memory, display devices) and therefore the data has various physical levels, each of which must have a corresponding abstract (logical) interpretation. Various types of cryptographic transformations are possible between the various levels of this architecture. The logical levels define formats for database records appropriate to the various levels, while the physical levels consist of instantiations of the data in the formats defined by the logical records. Typically, any number of physical records will exist for every logical record defined. Although the work of Gudes and of Gudes, Koch and Stahl was published in 1976, their model nevertheless takes into account a distributed computing model, since it at least implicitly recognized that the various levels of a multi-level database architecture could be located in physically separate locations.

Gudes et al. defined five logical levels in their database architecture: 1) a User-logical level, 2) a System-logical level, 3) an Access level, 4) a Storage level (or structured storage level), and 5) an Unstructured Storage level. One or more physical levels are assignable to each logical level according to the number of physical media. The correspondence of logical levels and physical levels is dependent on implementation details as well.

Gudes et al. detailed the specific types of cryptographic enciphering transformations that can be applied in the process of mapping between adjacent levels of their database architecture. Seberry and Peiprzyk give an updated summary and analysis of the work of Gudes, Koch and Stahl in their textbook on computer security [Seberry J. And J. Pieprzyk. "Cryptography: An Introduction to Computer Security." New York: Prentic-Hall, 1989, pp. 233–259].

The cryptography achieved by the multilevel database architecture of Gudes et al. refers to cryptograms as they exist in storage on a computer system. The multilevel cryptography does not in fact address the issue of how encrypted data is to be processed. The multilevel cryptography of Gudes et al. does not in all cases allow for direct access to data elements which are encrypted. Encrypted data may need to be decrypted first before certain items can be accessed.

The fundamental constraint that database cryptography faces is the requirement that data be stored in a manner that is useful for processing. The strength of the cryptographic transformations that can be applied using ciphers between adjacent levels in a database are limited by this constraint. Ultimately, it is necessary to store the data on a low level so that data can be easily retrieved. If this is not done, then additional processing must be done in order to reconstitute the data into a form that may be queried.

While combining different types of enciphering transformations can certainly lead to very strong ciphers, the limited number of database levels intrinsically available in a naturally formulated multilevel database architecture places a severe restriction on the quality of the cryptographic security that can ultimately be obtained using ciphers in a database without greatly impacting database performance for the worse.

The concept of a multilevel database architecture is well known. Various multilevel database architectures and associated terminologies have been defined. The "ANSI/SPARC" multilevel database architecture is the most widely recognized model of multi-level database architecture. Date's description of the ANSI/SPARC architecture given in [Date, C. J. "An Introduction to Database Systems." 5th ed. New York: Addison-Wesley, 1990. Vol. I., Chapter 2, pp. 31–54] is herein incorporated as background to the current invention.

Ciphers/Q-codes

There are two major branches of cryptography: ciphering and q-coding. Each branch deals with a different type of cryptosystem, i.e., ciphers and q-codes respectively. Ciphers involve transformations on the individual symbols or groups of symbols in an alphabet, including, for example, symbols such as upper and lower case characters, numbers, and punctuation symbols. Enciphering transformations are applied to individual symbols or groups of symbols in a completely general fashion without any specific rules for dealing with units of meaning. Texts of arbitrary and meaningless symbols can be as easily enciphered as texts with meaning. The syntactic units on which ciphers are performed have semantic content only incidentally. Q-code, on the other hand, involves transformations on syntactic units such as words, phases or even entire sentences which do specifically have semantic content. Any nontrivial q-code requires the use of a large codebook. An example makes the reason for this obvious: a simple q-code capable of coding all English language texts would require a codebook which includes equivalents for all English words, including proper nouns. A codebook utilized by a q-code constitutes the key to the code. The entries in a codebook can themselves also be regarded as keys.

The methods by which cryptanalysis is done are primarily based on the statistical properties of the plaintext domain. In attempting to cryptanalyze a ciphered cryptogram whose plaintext is presumed to be a message in a particular natural language for example, a cryptanalyst considers the frequencies of the individual letters and letter combinations of the supposed language of the plaintext. For q-code the frequencies of individual words and word combinations are considered.

SPARCOM

An Overview

SPARCOM is an acronym for Sparse Associative Relational Connection Matrix. It is a method proposed and researched by Ashany to dynamically structure data in a database system to achieve short response times and high throughputs for many types of applications. The approach involves the conversion of discretely valued data into large sparse binary matrices enabling the application of sophisticated sparse matrix techniques to perform database operations. The SPARCOM approach dictates that the sparse matrices are stored and manipulated in compressed format thereby saving on large amounts of storage and on execution times. An intrinsic normalization process peculiar to SPARCOM further reduces data redundancy which is often caused by entities with multiple values on any given attribute. Database operations are performed using algebraic manipulations on the sparse matrix structures which contain the structured information held by the database on the internal level.

SPARCOM provides for content addressability for discretely valued data, i.e., a data element can be addressed and retrieved as a function of its content. To obtain content addressability SPARCOM explodes a given entity-attribute relation into a corresponding entity-property relation. An entity-attribute relation indicates what attributes the given objects in a particular relation possess. A corresponding entity-property relation indicates whether or not the given objects possess the various properties corresponding to the full range of properties possible for the given attributes. The entity-property relation can be represented as a matrix that is likely to be quite sparse. While traditional relational database theory must create multiple relations for objects with multiple values for any given attribute (i.e., introduce multiple tuples into a table) SPARCOM does not do this since it is structured on the basis of entity-property relations.

Ashany describes the Binary Property Matrix that is the fundamental data structure of SPARCOM and how it corresponds to an entity-attribute relation [Ashany, pp. 62–63]:

An n-D attribute-space containing $A_1, A_2, \ldots, A_n$ attributes, with their domains of distinct elements $D_1, D_2, \ldots, D_n$ of cardinality $d_1, d_2, \ldots, d_n$, respectively, can be transformed into an N-dimensional property space where $$\sum_{i=1}^{n} d_i$$

represents the number of distinct properties $P_1, P_2, \ldots, P_n$ necessary to map any point from the n-D attribute-space into the N-D property-space. Obviously N is larger than n, and to represent a point in a multi-dimensional Euclidean space requires many more coordinate axes, thus larger vectors. In the property space, however, only two distinct points exist on each axis; zero and one, and each coordinate axis represents a specific property.

An entity that is described in the attribute-space by n single value attributes; i.e., by an n-tuple, is described in the property space by a binary N-tuple with n one values and N−n zero values. The one values are inserted in the positions representing the applicable properties. Since the cardinal number of attribute Sex is two (M,F) and the cardinal number of attribute Eyes-color is five (Black,Blue,Brown,Green,Hazel) the entity with properties (M,Blue); i.e., Sex-M and Eyes-Blue is represented by the 7-tuple E(1,0,0,1,0,0,0). The 2-tuple is transformed into a 7-tuple with two nonzero elements, and if the single value attributes would have respective cardinal numbers, say, $d_1=10$ and $d_2=12$ the 2-tuple from the attribute-space would be transformed into a 22-tuple in the property-space, again a binary vector with two nonzero values but 20 zero values. These vectors of the property-space are called Extended Binary Vectors (EBV) and they are usually very sparse.

A set of m entities will be described by a m×N binary matrix called the Binary Connection Matrix (BCM), because its nonzero elements indicate the connection that exists between each entity and its respective applicable properties, it is more specifically called the Binary Property Matrix (BPM). One important feature of EBV is that single-value attributes and multivalue attributes are represented by one and the same vector solving the redundancy problem . . .

By their nature Binary Property Matrices are particularly well suited for retrieval operations due to the fact that they have the important feature of being fully inverted files (in addition to being direct files) since each and every property is indexed. Range queries are also done much more easily using a SPARCOM approach when compared with traditional database architectures since only a single query vector needs to be multiplied against a BPM to obtain an answer. In contrast, attribute-oriented databases typically require multiple iterations of search operations to be performed to obtain answers for range queries.

The relations on which Binary Property Matrices are based have intrinsic normal forms, called SPARCOM normal forms (SNF's), which are distinguished from other relational database normal forms by being property-oriented rather than attribute-oriented and, most notably, by their different way of handling multivalued relations. The 1NF normalization process defined by Codd reduces the redundancies introduced by multivalued attributes by decomposing relations into multiple relations when multivalued attributes are present. Such decompositions are both unnecessary and inappropriate under SPARCOM. This is true because under SPARCOM relations are organized on the basis of properties rather than on the basis of attributes. In effect, the objective of 1NF is automatically achieved under SPARCOM without having to resort to the decomposition ordinarily associated with 1NF.

The Consultants relation given in FIG. 1A is not in 1NF. Let us suppose that the functional dependencies that exist for the attributes of the Consultants relation are as follows: Name⇒Rate, Name⇒Skills, and Name⇒Days. This is a likely assumption, although other dependencies could hold. The attributes Skills and Days given here are both multivalued attributes. For exposition purposes, in FIG. 1A the multivalued attributes Skills and Days have been treated in two different ways: multiple instances of Skills for any particular consultant are broken out into multiple records while multiple instances of Days that a consultant is available generates a repeating group within an individual record. Both of these methods of representing multivalued attributes are undesirable.

On the one hand, having multiple records for each instantiation of a multivalued attribute in a relation not in 1NF unnecessarily duplicates the other attributes which do not participate in the particular functional dependency involved. (In this case, the Rates and Days attributes do not participate in the Names⇒Skills functional dependency relation, but the data for them is replicated nevertheless.) On the other hand, repeating groups are not atomic values and hence operations on a record with repeating groups requires suboperations. Additionally, the records of a relation with repeating groups will either be of unequal length or they must include null values; and both cases are regarded as undesirable.

Decomposing the relation Consultants(Name, Rate, Skills, Days) to remove the multivalued attributes as required for 1NF yields the three separate relations CRate (Name,Rate), CSkills(Name,Skills) and CDays(Name, Days). FIG. 1B gives these 1NF relations obtained from this decomposition along with the data corresponding to that of FIG. 1A. The relations of FIG. 1B also happen to be in 3NF and BCNF (Boyce-Codd Normal Form) as well.

While decompositions in general reduce redundancies overall, nevertheless they do introduce lesser redundancies in the process, which can be seen in the example of FIG. 1B, where Name is found as part of every relation. This redundancy is necessary so that all relationships are preserved and serves to allow the original relations to be reconstructed by performing natural joins on the attributes which are present in multiple of the relations derived from the decomposition process.

FIG. 1C gives the SNF version of the Consultants relation given in FIG. 1A. Because of the fact that there is no need to do a decomposition to 1NF in a SPARCOM database, the redundancy introduced by this procedure can be avoided providing a more efficient representation of the data. This is certainly an advantage of the SPARCOM model over traditional attribute-oriented database models.

Ashany explains one of the principle performance advantages of the SPARCOM approach as follows [Ashany, p. 184]:

Many algorithms dealing with sparse matrices have one common denominator—only the nonzero elements of the matrix are stored. The goal is to operate on these matrices as though the entire matrix were present, but to save storage space, and in particular to reduce the access and execution time, because the zero entries need not be represented and manipulated.

Another major performance advantage of the SPARCOM method over other database methods stems from the content addressability of the data. Other database systems frequently require that multiple indexes be maintained to speed access for various types of queries. In a non-SPARCOM database system, if an index has not been built to support a particular query, then performance on the query will be very poor, since data items will need to be searched exhaustively when no index is available. SPARCOM does not require multiple indexes because it indexes all data. The various methods that can be used to compress the BPM's used by SPARCOM are in fact themselves indexing methods.

Sparse Matrix Concepts

As mentioned above, SPARCOM uses binary sparse matrices as the building block internal-level data structures in a property-oriented database. While the persistent data in SPARCOM consists of BPM's, the results of queries are in the form of non-binary matrices which may or may not be sparse themselves. Ashany discussed three schemes for indexing the coordinates of matrices. The methods that Ashany investigated included the "Bitmap" (BMS), "Single Index" (SIS), and "Double Index" (DIS) compression schemes. These schemes all provide significant compression on sparse matrices, with even greater amounts of compression obtained for binary sparse matrices. Database operations were performed on BPM's indexed according to each of these three schemes. Excellent performance results were obtained with each of the various compression schemes with the results showing better or worse performance depending on the indexing schemes, data sets and database operations selected.

FIG. 2 provides an example of how a matrix is compressed using the BMS, SIS and DIS compression methods described in more detail below.

Bit Map Scheme

In the bit map scheme a matrix A with dimensions m×n (m rows and n columns) is broken into three components: 1) a 2-tuple Dim (m,n) where m is the number of rows and n is the number of columns in A; 2) a binary matrix B with dimensions m×n where the non-zero values of A are replaced by ones in B; 3) a vector v whose elements are the non-zero values of A delineated in some order. The bits of the binary matrix component B can be stored as a bit string $S_B$ formed by concatenating the rows (or columns) of the matrix. The number of bytes required to store $S_B$ can be calculated with the following simple formula:

$$S_B = \lceil (m \times n)/S \rceil$$

where S is the number of bits in a byte. The order of the elements of v can be as they appear as they are scanned sequentially either by rows 1 to m or by columns 1 to n. Other orderings are of course also possible.

The bit map scheme achieves significant compression by storing each element of the binary matrix component B as a single bit. Under the bit map scheme multiple binary elements are therefore packed into a single byte in an obvious manner with the actual number of bits dependent on the byte size. It is clear that this method of compression is best accomplished on hardware that supports efficient bit manipulation operations using languages that support the use of this feature. It should also be apparent that a bit map representation of a BPM A does not require a vector component v, since the 2-tuple Dim(m,n) and the bit map component B suffices to fully define the BPM A.

Single Indexing Scheme

The single indexing scheme, in contrast to the bit map scheme, stores only the non-zero elements of a matrix. The single indexing scheme represents a non-binary matrix A using three components: 1) a 2-tuple Dim(m,n) where m is the number of rows and n is the number of columns in A; 2) a location vector $v_1$ whose elements list the locations of the non-zero elements in A; and 3) a vector $v_2$ whose elements are the non-zero values of A. The elements of the two vectors, $v_1$ and $v_2$, are indexed such that element $b_i$ in $v_2$ holds the value of the element found in matrix A at the location specified by the element $a_i$ in $v_1$.

The locations, k, of the elements (i,j) of A are defined by a linear mapping function $$k = f(i,j) = j + (i-1) \times n$$

where i and j are the row and column numbers respectively of the elements and n is the number of columns in A. This formula simply defines an ordering of the elements of a matrix which can be obtained by sequentially scanning the elements of a matrix one row after the next from row 1 to row m.

Binary matrices, such as BPM's, can be represented in a similar fashion using the single indexing scheme, but require just two components: 1) a 2-tuple Dim(m,n); and 2) a location vector $v_1$—both defined as above. Clearly, there is no need for a second vector, $v_2$, specifying non-zero values since all non-zero values are ones in a binary matrix.

Double Indexing Scheme

The double indexing scheme has three components, the second of which itself consists of two parts: 1) the 2-tuple Dim(m,n), defining the number of rows and columns of a matrix; 2) two vectors $v_1$ and $v_2$ for indexing the locations of the elements of a matrix; and 3) a vector $v_3$ whose elements are the non-zero values of A. Components 1 and 3 have identical counterparts in both the bit map and single indexing schemes already described and do not need any elaboration. As with the other compression schemes, the vector $v_3$ (which in this case holds the values of the non-zero elements of the matrix) is not needed for binary matrices.

For each row from 1 to m in a matrix A with Dim(m,n) vector $v_1$ sequentially lists the column numbers of the elements with non-zero values in A. The last element of $v_1$ must hold a distinguished symbol. Any symbol other than an integer in the range from 1 to n will do. (Ashany uses the symbol "Δ".) The number of elements in the vector $v_1$ is equal to one more than the number of non-zero elements in A.

The elements of vector $v_2$ specify the locations of the elements in $v_1$ that contain the first non-zero elements in each row of the matrix A. The elements of vector $v_2$ are themselves indexed such that element i of $v_2$ specifies the index number of vector $v_1$ which contains the first non-zero element in row i of matrix A. Vector $v_2$ contains m+1 elements. The last element of $v_2$ specifies the index of the last element of $v_1$, which is the distinguished symbol.

Other Indexing Schemes

There are many other techniques for compressing sparse matrices. An obvious technique that is frequently cited and which is easy to program involves the use of linked lists, either by rows or columns. Doubly-linked lists that allows data to be retrieved easily by either rows or columns can also be used, as can other methods, which index the non-zero sparse matrix values in arrays (like the SIS and DIS compression techniques) or in more complicated data structures.

Tradeoffs exist with the selection of different sparse matrix compression schemes. For example, compared with the bit map, single index and double index compression schemes described above, linked and doubly linked list implementations do not provide as much compression due to the increased overhead required to maintain the linked lists since each node of a list holds both an element value and link-address information. On the positive side, linked list structures are likely to provide better performance than the obvious methods of implementing the schemes described above on inserts of new non-zero elements into a sparse matrix. If the vectors used in the sparse matrix compression schemes above are implemented using simple arrays that are fully populated, then the insert of new sparse matrix elements necessitates that new arrays be constructed. At the very best this will involve either shifting the left subvectors backwards in memory or the right subvectors forwards in memory; and this assumes that adequate memory has been allocated in advance for these shift operations.

Queries

In SPARCOM a simple query is performed by matrix multiplying a BPM with the transpose of a query vector. A query vector is a row vector and must be constructed to have the same number of elements as the number of columns in a BPM that it queries. Query vectors are binary—i.e., they contain only ones and zeros. The ones in a query vector indicate the properties that are being searched for.

In SPARCOM the result of a simple query is a column vector (or response matrix) which is usually non-binary. The dimensionality of such a column vector corresponds with the number of rows in the BPM from which it is in part derived. The value of the ith element in the column vector obtained in a simple query signifies the number of properties that the query vector and the BPM for that query have in common. The degree of a query vector is the number of ones in the vector. For simple queries, row i of a BPM "matches" a query vector when the ith element of the (often non-binary) column vector obtained from a query equals the degree of the query vector. Another way of stating this is to say that for simple queries the threshold for the elements of the response matrix is equal to the degree of the query vector. FIG. 3 gives an example of a simple query.

Many types of more complex queries can be easily performed using a SPARCOM approach, including range queries and queries involving boolean operations. In a range query a multiple number of values (properties) are specified for some attribute. A range query returns those records having any one of the properties specified. Supposing we had a relation providing customer information, Cust(name, street,city,state,zip), a SQL statement over this relation specifying a range query on the state attribute could be given as follows:

Select * from Cust where state='NY' or state='NJ' or state='CT';

This SQL statement emphasizes the fact that range queries involve "or" operations—often multiple "or" operations. In attribute-oriented databases each "or" operation increases the search time required for a query. Under the SPARCOM approach a range query on a single-valued attribute can be accomplished by performing an ordinary matrix multiplication of a BPM with a query vector which includes all of the values in the range specified. The only adjustment that needs to be made in this case in order to obtain the matching rows is that the threshold for the elements of the response matrix should be made equal to the number of attributes queried and not to the degree of the query vector. Hence, under SPARCOM additional search time is not required for range queries over single-valued attributes. FIG. 4 shows an example of how a SPARCOM range query can execute the SQL statement on the Cust relation given above.

Matrix multiplication on sparse matrices compressed using certain techniques, e.g., the SIS and DIS compression techniques, need only process the non-zero elements of the sparse matrices as factors; as a consequence excellent performance can be obtained for matrix multiplication on sparse matrices.

The above overview of the SPARCOM approach to performing database operations serves as an introduction only. Ashany's Ph.D. dissertation [Ashany, R. "SPARCOM: A Sparse Matrix Associative Relational Approach to Dynamic Structuring and Data Retrieval." *Ph.D. Dissertation*, Polytechnic Institute of New York, June 1976] provides a more detailed description and is herein incorporated as background for the current invention.

SUMMARY OF THE INVENTION

The present invention pertains to an apparatus for secure storage of data. The apparatus comprises a database having a semantically encrypted store of data. The apparatus comprises a database mechanism for performing meaningful database operations with semantically encrypted data without requiring decryption of the data. The database mechanism is connected with the database. The apparatus also comprises an access mechanism connected to the database mechanism for obtaining data from the database mechanism.

The present invention pertains to an apparatus for data storage. The apparatus comprises a database having a semantically represented store of data. The apparatus comprises a database mechanism for performing database operations with the semantically represented data. The database mechanism is connected with the database. The apparatus comprises an access mechanism connected to the database mechanism for obtaining data from the database mechanism such that the access mechanism comprises different users with different representations of the semantically encrypted data.

The present invention pertains to a method for secure storage of data. The method comprises the steps of storing semantically encrypted data in a memory. Next there is the step of performing database operations with semantically encrypted data from the memory without requiring decryption of the data. Then there is the step of obtaining data from the memory.

BRIEF DESCRIPTION OF THE DRAWINGS

In the accompanying drawings, the preferred embodiment of the invention and preferred methods of practicing the invention are illustrated in which:

FIG. 1A illustrates a relation not in 1NF (First Normal Form) for background purposes.

FIG. 1B illustrates the relation of FIG. 1A after it has been converted to 3NF (Third Normal Form) for background purposes.

FIG. 1C illustrates the relation of FIG. 1A after it has been converted to SNF (SPARCOM Normal Form) for background purposes.

FIG. 2 provides an example of how a matrix is compressed using the BMS (Bit Map Scheme), SIS (Single Index Scheme), and DIS (Double Index Scheme) compression methods for background purposes.

FIG. 3 illustrates an example of a simple query using SPARCOM's method for performing queries for background purposes.

FIG. 4 illustrates an example of a range query using SPARCOM's method for performing range queries for background purposes.

FIG. 7A illustrates a BPM (Binary Property Matrix) for an example "Sales Rep" relation.

FIG. 7B illustrates a BPM for the same "Sales Rep" relation presented in FIG. 7A. The BPM is modified so that the number of columns and the property identities of the columns for the BPM matches the number of columns and the property identities of the BPM of the "Cust" relation with which it will be joined.

FIG. 7C illustrates a BPM which is obtained from the BPM of FIG. 7B after a projection has been done to "sanitize" the relation, selecting only columns that pertain to the "state" attribute.

FIG. 7D illustrates the BPM of FIG. 7C after it has been transposed.

FIG. 8 illustrates a BPM for the same "Cust" relation presented in FIG. 4. The BPM is modified so that the number of columns and the property identity of the columns for the BPM matches the number of columns and the property identity of the BPM of the "Sales Rep" relation with which it will be joined.

FIG. 9 illustrates the response matrix that is obtained from the matrix multiplication of the matrices of FIG. 8×FIG. 7D. This response matrix specifies the rows of the original BPM's (given in FIGS. 8 and 7B) that are to be joined.

DESCRIPTION OF THE PREFERRED EMBODIMENT

Figure 5:
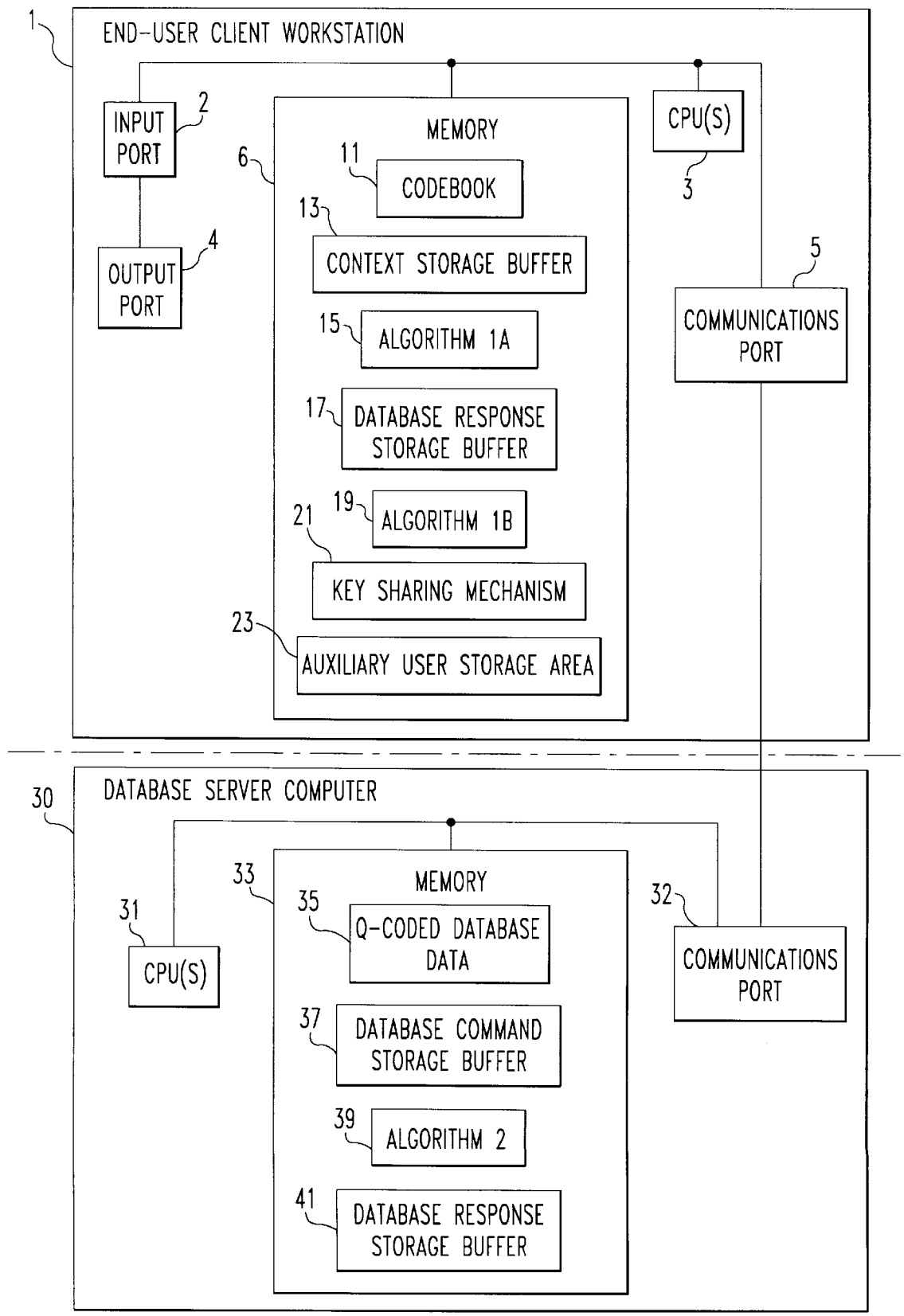
FIG. 5 illustrates in block diagram form the fundamental elements of the present invention.

Referring now to the drawings wherein like reference numerals refer to similar or identical parts throughout the several views, and more specifically to FIG. 5 thereof, there is shown an apparatus for secure storage of data. The apparatus comprises a database having a semantically encrypted store of data. The apparatus comprises a database mechanism for performing meaningful database operations with semantically encrypted data without requiring decryption of the data. The database mechanism is connected with the database. The apparatus also comprises an access mechanism connected to the database mechanism for obtaining data from the database mechanism.

The access mechanism preferably includes an encryption/decryption mechanism connected to the database mechanism for receiving the decrypted data, encrypting the data and providing it to the database, and for receiving the encrypted data from the database mechanism, and decrypting it. The access mechanism preferably includes an end-user client workstation having a user CPU and a workstation memory connected to the CPU, and wherein the encryption/decryption mechanism includes a code book stored in the memory and a software program in the memory which accesses and updates the code book.

The semantically encrypted data is preferably a property-oriented positional Q-code. The property-oriented positional Q-code preferably comprises sparse binary matrices. The property-oriented positional Q-code uses dummy columns, dummy rows, column splitting, column offsets, encryption of compressed sparse matrix dimensioned information for BPM column permutations to increase the security of each property-oriented positional Q-code.

The apparatus preferably includes a database server computer having the database mechanism and the database. The database mechanism preferably includes a server CPU and a server memory connected to the server CPU. The server memory has the database. The server memory preferably includes a database command storage buffer, and a database response storage buffer. The server computer preferably includes a server communication port connected to the server memory and the server CPU. The workstation preferably includes a work station communications port connected to the server communications port and to the work station CPU and the work station memory, an input port and an output port, both of which are connected to the work station memory and the work station CPU and the work station communications port.

The present invention pertains to an apparatus for secure storage of data. The apparatus comprises a database mechanism having fully indexed data. The apparatus also comprises a database mechanism for performing operations of or with fully indexed data having index information which permits access and interpretation of the fully indexed data. The database mechanism is connected to the database. The apparatus comprises an access mechanism connected to the database mechanism for obtaining data from the database mechanism.

The present invention pertains to an apparatus for data storage. The apparatus comprises a database having a semantically represented store of data. The apparatus comprises a database mechanism for performing database operations with the semantically represented data. The database mechanism is connected with the database. The apparatus comprises an access mechanism connected to the database mechanism for obtaining data from the database mechanism such that the access mechanism comprises different users with different representations of the semantically encrypted data.

The access mechanism provides different users with different natural language translations of the semantically represented data. Alternatively, the access mechanism provides a sight-impaired person with an audio representation of the semantically represented data.

The present invention pertains to a method for secure storage of data. The method comprises the steps of storing semantically encrypted data in a memory. Next there is the step of performing database operations with semantically encrypted data from the memory without requiring decryption of the data. Then there is the step of obtaining data from the memory.

Figure 6A:
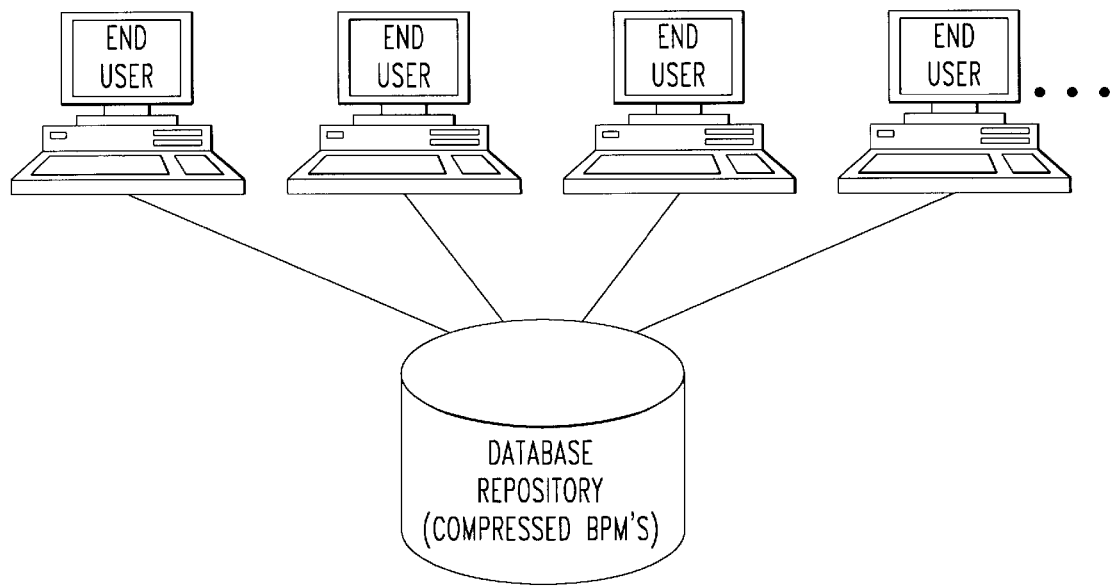
FIG. 6A illustrates the network architecture of a preferred embodiment of the present invention.

The central idea of the present invention, essentially a database encryption mechanism and method, as illustrated in FIG. 5, is to organize and distribute database information such that external-level (user-level) and/or conceptual-level (community level) schema information is located on end-user client workstations while internal-level data in the form of q-coded information is held on one or more separate database servers. In addition to external-level or conceptual-level schema information, the database information residing on any given end-user client workstation is a codebook consisting of a list of pairs of values. One member of each pair specifies a property; the other value specifies a set of q-code equivalents for the given property. The codebooks can therefore be seen to provide an index of the properties that a given end-user client workstation has cryptographic keys for. In the preferred embodiment, the database information (data content) residing on any given database server is a SPARCOM database, i.e., it consists of a set of compressed BPM's, each being an instantiation of a particular property-entity relation. The database servers do not hold the index information required to interpret this internal-level compressed BPM data. The network architecture of a preferred embodiment is illustrated in FIG. 6A.

Referring to FIG. 5, as mentioned above on the end-user client workstations (1), algorithm 1A (15) receives user input on the input port (2), parses the input, performs codebook lookups to determine the encrypted equivalents for the properties specified in the input, formulates encrypted database commands, submits these to a database server and stores information about the command issued in the context storage buffer (13). Algorithm 1B (19) waits for a cryptogram response to be received on (5) sent from the communications port (32) of a database server computer (30), reads the cryptogram and temporarily stores it in the database response storage buffer (17). Algorithm 1B (19) then checks the context storage buffer (13) to determine what command the cryptogram response received pertains to, decrypts the cryptogram by doing codebook lookups to determine the plaintext equivalents of the elements of the cryptogram received, and handles the plaintext results as directed by the user on (1), i.e., either directing the output to (4) or to (23) or both. The data structure at the heart of algorithms 1A and 1B is the codebook (11). The codebook (11) on an end-user client workstation (1) contains a listing of the specific properties for the particular tables that the individual workstation (1) is granted access to. A codebook listing will consist of a set of (Property,Column) 2-tuples. This set may itself be completely partitioned into distinct subsets of (Property,Column) 2-tuples, each set being a view of a different table on a database server (12). A view may or may not list all of the columns in a given table depending on the access privileges specified for a given user. Typically, the columns that might be excluded from a particular view of a table would themselves be composed of groups of columns, each pertaining to particular attributes in the table; however, a finer level of granularity would easily be possible since a user could just as easily be granted access to only a portion of the columns relating to a particular attribute.

A codebook can be implemented as a simple list of records having two fields which is stored either linearly or as a linked or doubly-linked list in memory (6). Many other algorithms are available that are well known to one skilled in the art which enable forward and reverse lookups to be performed efficiently on pairs of associated items. Fast codebook lookups are important for the present invention since non-trivial databases which utilize the invention will have a large number of properties.

Figure 6B:
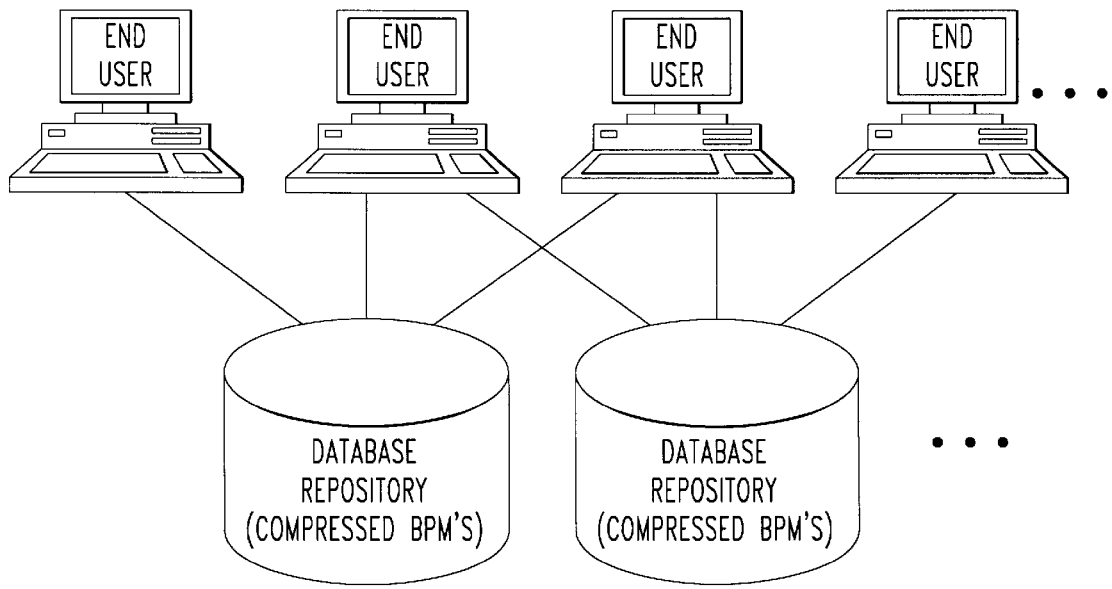
FIG. 6B illustrates another network architecture of a preferred embodiment of the present invention.

In one preferred embodiment, the distinct individual subsets of a codebook's (11) 2-tuples that refer to different database tables are each collected and programmed for fast lookups as two distinct associative arrays, i.e., two associative arrays for each table, one providing forward lookups from properties to column numbers, the second providing reverse lookups from column numbers to properties. In an alternative preferred embodiment, all the (Property,Column) 2-tuples of a codebook taken together as a single set are programmed for fast lookups using two associative arrays (one for forward lookup and one for reverse lookups) where each Property field is constructed as a string consisting of the ordered pair (Tablename,Property'). Here Property' signifies a property (i.e., an ordered attribute-value pair) which may appear in multiple tables. The (Property,Column) 2-tuples will therefore appear as codebook entries with the following format: (Tablename.Property',Column). It should be noted that the field Tablename may itself be a compound entity with Tablename=(Owner.Tablename'), since several tables owned by different users may be identically named. Furthermore, as indicated in FIG. 6B, multiple database servers can exist on the network. Therefore, the values for Property may actually take on a more extended hierarchical structure, e.g., Address.Database.Owner.Tablename'.Property'. It may be observed that each codebook itself in fact constitutes a simple special purpose single-user database.

Algorithm 1A (15) converts plaintext Property information into positional q-code Column information. It (15) accomplishes this by doing a "forward lookup" in an end-user client workstation codebook (11). Algorithm 1B (19) converts positional q-code Column information to plaintext Property information. It (19) accomplishes this by doing a "reverse lookup" in a codebook (11).

Queries and other database operations are formulated into SPARCOM database commands containing positional q-code on the end-user client workstations (1) as explicated above. A database command thus formulated on an end-user client workstation is sent over the network to a database server (30). A database command sent to a targeted database server computer (30) is thus a cryptogram since it contains positional q-code information. The network traffic containing database commands sent from the communications port (5) of an end-user client workstation (1) to the communications port (32) of a database server computer (30) is obviously itself encrypted since it contains the database command cryptograms. (This network traffic can of course be additionally encrypted using other types of encryption techniques, such as DES or RSA.)

Referring to FIG. 5, in the preferred embodiment Algorithm 2 (39) parses the database command received on communications port (32). The command contains positional q-code information and is therefore a cryptogram. Algorithm 2 (39) then stores the database command in the database command storage buffer (37), and executes the command found in the buffer (37), performing the operation specified in the command on the positionally q-coded database (35). Queries and other internal-level database operations are performed on BPM data held on a database server computer (30) using the SPARCOM approach discussed in the background, which means performing operations on the compressed binary property matrices found in the q-coded database (35) which is contained in the memory (33) of a database server computer (30). It should be noted that the database operations executed are thus performed directly on the encrypted data stored on the database server computer (30) without at any time exposing the data in plaintext form there. The output generated by performing a database command on the positionally q-coded database will consist of a compressed BPM and operation status information, e.g., "transaction ID number", "success", "failure", and is temporarily stored in the database response storage buffer (41). (Operation status information is not essential to the basic functioning of the present invention, but rather is a standard database program feature which can be provided on the system. The use of a "transaction ID number" assists in keeping track of individual transactions in a complex networked system. Other methods can similarly handle this system requirement. The use of a "transaction ID number" is simply indicated as one method of addressing this need.) The last step performed by Algorithm 2 (39) is to send the output generated by the execution of the database command back to the end-user client workstation (1) which initiated the command.

The network traffic containing the output generated by the execution of a database command on a database server (30) sent from its communications port (32) to the communications port (5) of an end-user client workstation (1) is obviously itself encrypted since it contains a compressed BPM, which is a positional q-code cryptogram—at least in the case where data is returned. (As with network traffic in the other direction, this network traffic can of course be additionally encrypted using other types of encryption techniques, such as DES or RSA.)

In an alternative embodiment, the end-user client workstations themselves directly perform database operations on the BPM's located on the database server computer. In this case a database server simply acts as a fileserver for the database. All SPARCOM database operations (e.g., queries which involve the matrix multiplications) are performed by the end-user client workstations using their own CPU's and memory caches. The usual tradeoffs exist between the two approaches. Central processing of the data will put greater demands on the central host machine. Remote processing of the data on networked workstations will ease the burden on the central host computer and take advantage of the processing power on the desktop, but may generate more network traffic and may present more difficulties with regard to multiple end-user client workstations attempting to simultaneously alter the data on a database server computer.

EXAMPLE 1

The following annotated example demonstrates an instance of how the SPARCOM range query example given earlier in the background section is handled by the preferred embodiment of the present invention. The non-compressed data representation (BPM) for the "Cust" relation is given in FIG. 4.

1) The user issues a high-level database range query command on the input port (2) of an end-user client workstation (1):

Select * from Cust where state in ('NY', 'NJ', 'CT');

2a) Algorithm 1A (15) reads this input and parses it.

2b) Algorithm 1A (15) does a forward codebook lookup on the codebook (11) to determine the column numbers for the properties specified in the range query.

The entries in the codebook (11) that are pertinent to the Cust table are as follows:

| | |
|---|---|
| name.Lynn | 1 |
| name.Mark | 2 |
| name.Bill | 3 |
| name.Sam | 4 |
| name.Liza | 5 |
| name.Carl | 6 |
| street.5 Oak | 7 |
| street.6 Gunn | 8 |
| street.2 Pine | 9 |
| street.8 Main | 10 |
| street.4 Main | 11 |
| city.Nyack | 12 |
| city.Union | 13 |
| city.Derby | 14 |
| city.Reno | 15 |
| city.Butte | 16 |
| state.NY | 17 |
| state.NJ | 18 |
| state.CT | 19 |
| state.NV | 20 |
| state.MT | 21 |

2c) Algorithm 1A (15) constructs a query vector based on the schema info provided by the codebook lookups on the properties specified. The query vector it constructs is a binary vector which has 1's in the array elements whose indices correspond to the column numbers found in the codebook lookups. All other array elements are 0's. Algorithm 1A (15) therefore constructs the appropriate query vector which includes the column number equivalents for NY, NJ and CT. The query vector QV can be represented in uncompressed form as follows: QV=(000000000000000011100); however, as with the BPM's it is of course possible and desirable to generate the query vector directly in a compressed form.

One preferred method of generating this query vector in compressed format allocates an array with a length equal in size to the number of non-zero ("1's") elements of the query vector; the indexes (i.e., column numbers) of the non-zero query vector elements are then successively entered into the compressed representation of the vector. (Alternative methods of compressing the query vector are of course possible, e.g., the vector can be represented as a linked list of the indices of the non-zero column numbers.) The query vector QV is therefore represented as follows: QV=(17,18,19).

A range query is then constructed and a "threshold value" is specified by Algorithm 1A (15) on the end-user client workstation (1). (The threshold value—"1" in this case—is used to determine which entries of the response matrix generated by the query indicate that the corresponding row of the queried BPM matches the selection criteria.) The query consists of four fields: 1) an op-code (operation code), 2) a Table (i.e., BPM) identification number, 3) the query vector QV, and 4) a unique transaction id number. Assuming that the database server computer (30) is designated as "1" (note that there may be multiple database servers), that user "6" is the owner of the Cust table which has an identification number of "38", and that client4 (the end-user client workstation formulating the range query) has generated a unique transaction ID "client4.id185", then the query contains the following data:

Op-code="Range Query, Threshold value=1", Table ID=1.6.38, Query Vector=(17,18,19), Transaction ID=client4.id185

Using a more concise representation of the Op-code, i.e., "RQ1" for "Range Query, Threshold value=1" in this case, the query Algorithm 1A (15) constructs is as follows:

RQ1 1.6.38 (17,18,19) client4.id185 where spaces are used to delimit the fields. Obviously, other delimiters would work equally well and the ordering of the fields is simply a matter of convention. It is also a trivial matter to further generalize the table identification number to include the case where multiple databases can reside on the same database server computer, e.g., 1.3.6.38 could be used to indicate that the database operation applies to database server computer "1", database "3" (i.e., the third database on database server computer "1"), user "6", and table "38".

2d) Algorithm 1A (15) on the end-user client workstation (1) then sends the range query above from the communications port (5) to the database server computer (30) designated as "1". It also stores the query submitted in the context storage buffer (13), along with other relevant context information such as where to direct the output of the response to the query.

3a) Algorithm 2 (39) in the memory (33) of the database server computer (30) designated as "1", then receives the command (sent by Algorithm 1A (15) in the previous step) on the communications port (32) of the database server computer (30).

3b) Algorithm 2 (39) parses the command and executes the command specified.

The op-code in this case is "RQ1", meaning "Range Query, Threshold value=1", the command references Table 38, and the command provides a query vector, QV=(17,18,19). Algorithm 2 (39) therefore executes the matrix multiplication:

$$RM = BPM_{38} \times (17\ 18\ 19)^T$$

where RM is the response matrix, Table 38=$BPM_{38}$ and $(17\ 18\ 19)^T$ is the transpose of the query vector QV=(17,18,19). The annotated figure, FIG. 4, discussed in the background, gives an uncompressed representation of this matrix multiplication.

In one of the preferred embodiments of this invention, Table 38 (i.e., $BPM_{38}$) is implemented as a BPM compressed using the single index compression scheme described in the background section. Hence, Table 38 (i.e., $BPM_{38}$) is represented as a single vector along with its dimensions as follows:

(1,7,12,17,25,32,34,41,44,52,56,61,68,71,79,84,87,93, 99,102,111,112,117,122) Dim(6,21)

Likewise, the response matrix RM is represented as a vector along with its dimensions as follows:

(1,3,5,6) Dim(6,1)

(There is no need to store the values of the non-zero entries in the response matrix in this case since they are all equal to 1 due to the nature of the query.)

The response matrix, RM, is then used to select the rows from Table 38 which meet the selection criteria. (Note that this can actually be done "on the fly" so that the response matrix, RM, does not actually ever need to be explicitly stored.) The op-code indicates "RQ1", a range query operation with a threshold value of 1, so the row numbers of the entries in the response matrix with a value of 1 indicate that the corresponding rows in $BPM_{38}$ satisfy the range query. Therefore, as indicated in FIG. 4, rows 1, 3, 5 and 6 are selected as matches for the range query. (As noted in the background section different queries will have different threshold values.) Algorithm 2 (39) creates a new matrix, $BPM_{Response}$, consisting of the four rows of $BPM_{38}$ which satisfy the range query. The non-compressed BPM which this represents is given as follows:

$$\begin{bmatrix} 1 & 0 & 0 & 0 & 0 & 0 & 1 & 0 & 0 & 0 & 0 & 1 & 0 & 0 & 0 & 0 & 1 & 0 & 0 & 0 & 0 \\ 0 & 1 & 0 & 0 & 0 & 0 & 0 & 0 & 0 & 1 & 0 & 0 & 0 & 1 & 0 & 0 & 0 & 0 & 1 & 0 & 0 \\ 0 & 0 & 1 & 0 & 0 & 0 & 0 & 0 & 1 & 0 & 0 & 0 & 0 & 0 & 1 & 0 & 0 & 1 & 0 & 0 & 0 \\ 0 & 0 & 0 & 0 & 0 & 1 & 1 & 0 & 0 & 0 & 0 & 1 & 0 & 0 & 0 & 0 & 1 & 0 & 0 & 0 & 0 \end{bmatrix}$$

However, $BPM_{Response}$ is created in compressed form and using the single index compression scheme is represented as follows:

(1,7,12,17,23,31,35,40,45,51,57,60,69,70,75,80) Dim(4, 21)

$BPM_{Response}$ is temporarily stored in the database response storage buffer (41).

3c) Algorithm 2 (39) next sends a cryptogram response from the database server computer (30) (which is designated as database server computer "1" in this case) via the communications port (32) to the communications port (5) of the end-user client workstation (1) which sent the command just processed, i.e., client4 in this case. The cryptogram response consists of four fields: 1) the vector from the single index scheme compression of $BPM_{Response}$, 2) the ordered pair giving the dimensions of $BPM_{Response}$, 3) the transaction ID, "client4.id185", originally sent with the range query to uniquely identify it, and 4) an operation status code indicating the successful completion of the RQ1 operation specified. Fields 1) and 2) are taken from the database response storage buffer (41), field 3) is taken from the database command storage buffer (37), while field 4) is generated directly by Algorithm 2 (39). Assuming that "RQ1AA" represents the appropriate status code, the cryptogram response sent is as follows:

(1,7,12,17,23,31,35,40,45,51,57,60,69,70,75,80) (4,21) client4.id185 RQ1AA where spaces are used to delimit the fields as before.

4a) Algorithm 1B (19) on the end-user client workstation (1), client4 in this case, processes the cryptogram response above sent from the communications port (32) of the database server computer (30) (which is designated as database server computer "1" in this case). It reads the cryptogram response received on the communications port (5) and temporarily buffers it in the database response storage buffer (17). Algorithm 1B (19) then decrypts the cryptogram response received using the following steps:

1) Checks the operation status code, and proceeds because RQ1AA indicates success.

2) Checks the transaction ID. The transaction ID is used to locate the context information specified for this transaction in the context storage buffer (13), which indicates that this transaction pertains to the "Cust" relation.

3) Decrypts $BPM_{Response}$ (which is given in single index scheme compressed form in the first two fields of the cryptogram response) by doing reverse lookups in the codebook (11) to determine the properties present in each of the rows of $BPM_{Response}$. The reverse lookups are done on those codebook entries pertaining to the "Cust" relation and they find the (plaintext) property equivalents for the column numbers specified by $BPM_{Response}$.

4b) Algorithm 1B (19) checks the context information specified for this transaction in the context storage buffer (13) to determine how the decrypted data generated in step 4a above is to be directed and formatted. The context information may specify that output is to be sent directly to the output port (4), or to the auxiliary user storage area (23), or it can specify that output is directed to both the output port (4) and the auxiliary user storage area (23). Alternatively, the context information may specify that the output is to be passed to some other process or application residing in the memory (6) of the end-user client workstation (1).

Assuming a normal type of formatting for the data, the output that is generated by Algorithm 1B (15) is as follows:

| Lynn | 5 Oak Street | Nyack, NY |
|------|--------------|-----------|
| Mark | 8 Main Street | Derby, CT |
| Bill | 2 Pine Street | Reno, NJ |
| Carl | 5 Oak Street | Nyack, NY |

Insert, update, and delete operations can be performed using the present invention in a manner which is analogous to the example given above for a range query (Example 1) with the obvious difference that the data is altered in the q-coded database (35) in the memory (33) of a database server computer (30). With regard to implementing insert and update operations using the SPARCOM method, provision must be made for adding columns to a database table (BPM) when new properties are specified. This has not to our knowledge been addressed in the prior art. A preferred method for dealing with this issue is for the creator of any table to specify the number of columns the underlying BPM will have. New properties are then assigned column numbers as they are introduced into a table (BPM) without having to resize the column dimension of the BPM. Column numbers without properties assigned to them are put into an "available column storage pool" and assigned in any order (e.g., sequentially or randomly) on an as-needed basis and then removed from the "available column numbers pool." A default number of columns can be provided by the DBMS when no value is provided by the table creator.

It is clear that the number of columns in a BPM affects the size of the compressed representation of the BPM, even though only the non-zero values in the BPM are stored. The sizes of the compressed BPM's will be roughly proportional to the number of bits required to represent the number of columns, e.g., a BPM with 65,536 ($2^{16}$) columns can each be represented in 16 bits on many underlying computer hardware architectures.

Presetting the number of columns in a BPM before new properties are introduced into it (whether by insert or update operations) can facilitate the performance of inserts and updates in a SPARCOM database—especially when a single index compression scheme is utilized. For example, consider the single index scheme representation of the BPM of FIG. 4:

(1,7,12,17,25,32,34,41,44,52,56,61,68,71,79,84,87,93, 99,102,111,112,117,122) Dim(6,21), inserting a new row into this BPM with new property information (Ann, 6 Gulf Road, Tampa, Fla.) requires adding four new property columns to the BPM. The non-compressed modified BPM is then represented as follows:

where the new row inserted is the last row of the modified BPM and the four new property columns are columns 22–25. The single index scheme representation of this modified BPM is given as follows:

(1,7,12,17,29,36,38,52,60,64,69,80,83,91,96,103,109, 115,118,131,132,137,142,172,173,174,175) Dim(7, 25).

Clearly, because the number of columns in the BPM is changed in this example by the addition of new properties, the index values of all the non-zero ("1's") entries in the BPM had to be recomputed for the single index compression scheme representation of the BPM.

Presetting the number of columns to a large number prior to inserting data into a BPM eliminates the problem of having to recompute the indexes of the non-zero ("1's") entries in the BPM under the single index compression scheme.

JOINS

Joins are especially important operations in a relational database system. One skilled in the art can certainly implement join operations in a SPARCOM DBMS (i.e., in a DBMS that uses the SPARCOM method of structuring and manipulating database information) and hence on a system utilizing this invention. Nevertheless, specified herein below are two useful and non-obvious systems and methods for numbering the columns in a SPARCOM database which facilitate the construction of natural joins (also known as equi-joins) which are not to our knowledge specified elsewhere.

Our preferred method and system for implementing a SPARCOM database system combines all relations of the database into a single "database binary property matrix", or "DBPM". The DBPM incorporates all properties (i.e., columns) present in the relations of the database (which are preferably in SPARCOM normal form), merging those columns which apply to the same property, and adding columns for each relation which is incorporated into the DBPM. Hence, each row of the database pertains to a specific database relation (preferably in SPARCOM normal form) and the relation to which a row pertains is indicated by the presence of a "1" in the column associated with the particular relation. A second preferred method (and system) for implementing a SPARCOM database system provides a virtual implementation of the DBPM. It utilizes the same column numbering scheme as would be obtained using the first preferred embodiment, but (as with Ashany's original formulation of the SPARCOM method) maintains separate BPM's for each relation. In the case of the second preferred embodiment of this invention it should be noted that all BPM's have the same total number of columns, though of course in compressed form only the non-zero (i.e., "1" columns) will be stored and/or manipulated. Also, in the second method it is not necessary to maintain columns to represent the particular relations that individual rows pertain $$\begin{bmatrix} 1 & 0 & 0 & 0 & 0 & 0 & 1 & 0 & 0 & 0 & 0 & 1 & 0 & 0 & 0 & 0 & 1 & 0 & 0 & 0 & 0 & 0 & 0 & 0 & 0 \\ 0 & 0 & 0 & 1 & 0 & 0 & 0 & 0 & 0 & 1 & 0 & 1 & 0 & 0 & 0 & 0 & 0 & 0 & 0 & 0 & 0 & 0 & 0 & 0 & 0 \\ 0 & 1 & 0 & 0 & 0 & 0 & 0 & 0 & 1 & 0 & 0 & 0 & 1 & 0 & 0 & 0 & 0 & 1 & 0 & 0 & 0 & 0 & 0 & 0 & 0 \\ 0 & 0 & 0 & 0 & 1 & 0 & 0 & 1 & 0 & 0 & 0 & 0 & 0 & 0 & 1 & 0 & 0 & 0 & 0 & 1 & 0 & 0 & 0 & 0 & 0 \\ 0 & 0 & 1 & 0 & 0 & 0 & 0 & 1 & 0 & 0 & 0 & 0 & 0 & 1 & 0 & 0 & 1 & 0 & 0 & 0 & 0 & 0 & 0 & 0 & 0 \\ 0 & 0 & 0 & 0 & 0 & 1 & 1 & 0 & 0 & 0 & 0 & 1 & 0 & 0 & 0 & 0 & 1 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 0 & 0 & 0 & 1 & 1 & 1 & 1 \end{bmatrix}$$

to, since obviously all rows in a given BPM pertain to an individual relation.

A SPARCOM DBMS can easily provide support for numbering the columns of a SPARCOM database according to this unique numbering system. The DBMS can maintain a counter and simply assign any new property added to the database a new column number equal to the value of the incremented counter. More complex yet easy to program methods of assigning column numbers that are unique within a SPARCOM database can also clearly be used. Presetting the number of columns for the DBPM and putting all column numbers into an "available column number pool" at the time of database creation will allow the use of a random number generator to "randomly" select column numbers from the range of available numbers in the "available column number pool." In the present invention the assignment of identical column numbers to identical properties in different relations is accomplished on an end-user client workstation (1) by checking its codebook (11) to determine whether the Property' already exists, where Property' signifies an attribute-value pair as defined above.

A natural join involving non-null attributes of relations can easily be accomplished on a SPARCOM database whose columns are ordered according to the above scheme by multiplying the BPM's of the two relations involved in the natural join. Prior to performing the multiplication a projection should first be performed on one of the relations to filter out all attributes not involved in the join. The multiplication should then be performed using the "sanitized relation".

By using the universal numbering scheme specified here all BPM's in a database will have the same number of columns, thereby making the BPM's associated with all relations conformable for multiplication with one another after one or the other of the matrices is transposed. Also by using the universal numbering scheme specified, the fact that identical properties in different relations share the same column numbers makes it so that when the matrices are multiplied the positions of the non-zero ("1's") in the response matrix indicate which rows of the BPM's involved in the matrix multiplication are to be joined. The response matrix obtained from the matrix multiplication is thus used to select the rows of the two original BPM's of the matrix multiplication that are to be joined with one another. Filtering out common attributes not involved in a natural join prior to performing the matrix multiplication for the join (i.e., "sanitizing the relation", as it has been called here) will prevent "false positives" from being obtained in the response matrix. Note however that the response matrix indicates which rows or the original BPM's are to be joined, i.e., the BPM's of the relations being joined.

Clearly, using this scheme for numbering the columns in a SPARCOM database greatly increases the size of the BPM's taken in their non-compressed forms, yet once again its actual impact on the size of the data stored is much less since the BPM's are of course stored in compressed format.

The following example demonstrates how a natural join can be performed on SPARCOM structured data when the column numbers are assigned in accordance with the specification given here. The data set used is very small for exposition purposes.

EXAMPLE 2

Consider the BPM given in FIG. 4 for the "Cust" relation and the BPM given in FIG. 7A for the "Sales Rep" relation. These two BPM's can be modified so that they have the same number of columns and so that all properties which the two relations have in common utilize the same column numbers. The two modified BPM's, for "Cust" and "Sales Rep" are given in FIG. 8 and FIG. 7B respectively. A SQL statement joining these two relations on the "state" attribute is given as follows:

Select * from Cust c, Salesreps where c.state=s.state;

Doing a projection to select only the "state" properties of the Sales Rep relation we obtain the BPM given in FIG. 7C. Transposing this BPM we get the PPM given in FIG. 7D. Performing a matrix multiplication between the BPM of the "Cust" relation (FIG. 8) with the transposed BPM of the Sales Rep relation (FIG. 7D) we obtain the Response Matrix $BPM_9$ given in FIG. 9. $BPM_9$ has three non-zero ("1's") entries: (1,1), (1,3) and (2,2). These entries specify the rows of the original BPM's (given in FIGS. 8 and 7B) that are to be joined: Row 1 of $BPM_8$ with row 1 of $BPM_{7B}$, Row 2 of $BPM_8$ with Row 2 of $BPM_{7B}$, and Row 6 of $BPM_8$ with Row 1 of $BPM_{7B}$.

KEY EXCHANGE

In the present invention each end-user client workstation is only able to interpret the BPM data on a database server computer for which it has codebook information. Stating this observation negatively: end-user client workstations are unable to interpret the meaning of those columns for which they have no codebook entries. In order for BPM database information to be accessible to two or more end-user client workstations the codebooks of these end-user client workstations must contain entries for those properties which they share access. Clearly, the present invention requires that some mechanism or method be utilized to securely distribute codebook information (either full or partial as appropriate) so that database information can be shared. When new properties are added to a table from an end-user client workstation those other end-user client workstations which are to be granted access to this information must have their codebooks updated with entries for the new properties. The exchange of codebook entries is clearly a key-exchange issue. Codebook entries are cryptographic keys; hence, the transfer of information detailing codebook entries is an exchange of cryptographic keys.

The problem of how to securely exchange cryptographic keys is a well-known problem that is successfully addressed by a number of protocols and methods.

Codebook update information can be distributed either directly (peer to peer) or it can be distributed using a trusted intermediary.

Taking a peer to peer approach using public key cryptography (e.g., RSA) to handle the exchange of codebook entries, the key sharing mechanism (or algorithm) of an end-user client workstation (referred to in the below steps as a "sending station") performs the following steps in sending codebook updates to other end-user client workstations:

Step 1) A check is performed to determine which other end-user client workstations are entitled to access the database information associated with the codebook entries which are to be distributed. In one preferred embodiment of this invention this information is maintained locally; in another preferred embodiment this information is held remotely on a trusted third party computer.

Step 2) The codebook entries are digitally signed (enciphered) using the private key of the sending station.

Step 3) The digitally signed (and hence enciphered) codebook entries are then encrypted using the public keys of the end-user client workstations authorized to receive the codebook updates.

Step 4) The appropriate codebook updates are sent from the sending station to the other end-user client workstations authorized to receive the updates.

An end-user client workstation which receives an enciphered codebook update (referred to in the below steps as a "receiving station") performs the following steps in receiving codebook updates from a sending station:

Step 1) It receives a public-key enciphered codebook update. It checks whether the sending station is authorized to provide updates; if so, it proceeds to the next step, otherwise, notification is made that a security violation has occurred.

Step 2) It deciphers the codebook update received using its private key (i.e., the receiving station's private key). This (presumably) yields another enciphered message consisting of the codebook updates enciphered with the sending station's private key.

Step 3) It decrypts the cryptogram obtained from the preceding step using the public key of the sending station, to verify the origin of the codebook updates received. If the updates received are legitimate (i.e., the sending station is allowed to provide updates to the codebook for the particular relation specified) then the receiving station proceeds to the next step; otherwise, notification is made that a security violation has occurred.

Step 4) The receiving station's codebook is updated with the information received.

A low-tech method for securely exchanging keys which is not fast, but which is nevertheless effective, is for the user of an end-user client workstation to personally transfer diskettes with appropriate codebook updates to other users who are authorized to have access to the q-code column information being transferred. As an additional safeguard the contents of each of the diskettes can be encrypted using the respective public keys of the intended recipients so that only the intended recipients will be able to make use of the data.

Figure 10A:
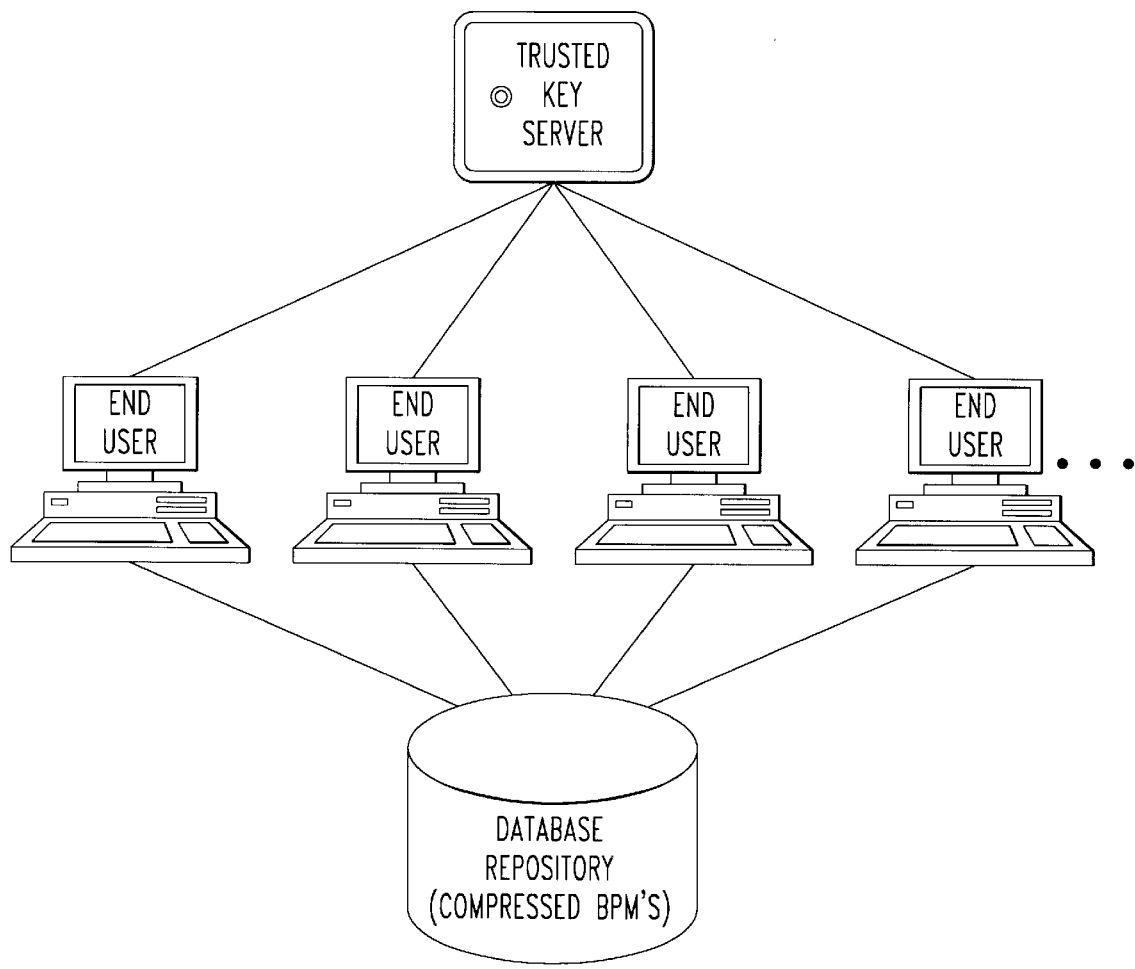
FIG. 10A illustrates another network architecture of a preferred embodiment of the present invention.
Figures 10B, 11:
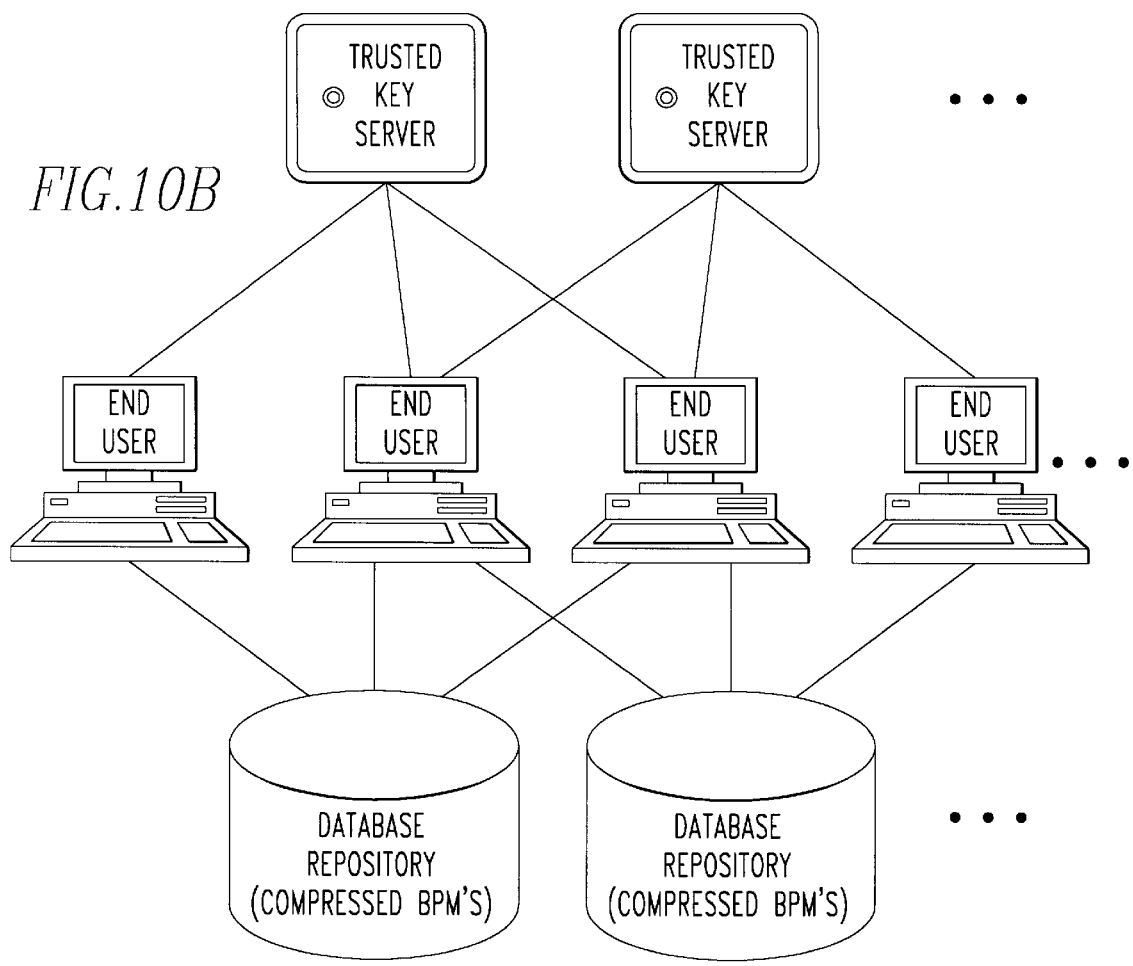
FIG. 10B illustrates another network architecture of a preferred embodiment of the present invention.
FIG. 11 illustrates the ordering of the coordinates of a 5×8 matrix under the single index compression scheme (SIS) and gives an example matrix along with the SIS representation of the example. It is to be noted that encrypting just the dimension information of this SIS representation of the matrix further enhances the cryptographic security provided by the encoded matrix at virtually no performance cost.

A "trusted key server" can also be used to distribute codebook information. In this case, updates can first be sent to the trusted key server and the trusted key server would then check its authorization database and forward the enciphered codebook updates to the end-user client workstations authorized to have the information. FIG. 10A gives an illustration of an architecture for this invention which includes a trusted key server. It should be noted that a trusted key server need not be invested with "complete trust". For instance, it need not be granted access to any database server computers on the network, nor need it be the sole conduit through which keys are distributed. Thus, a DBA (database administrator) could administer a trusted key server and define database tables, but nevertheless not have access to the data. Multiple trusted key servers can be used as well. FIG. 10B gives an illustration of an architecture for this invention which includes multiple trusted key servers as well as multiple database server computers.

CRYPTOGRAPHIC ENHANCEMENTS

Enhancing the Strength of the Positional Q-codes

A number of methods for altering the apparent statistical frequencies of properties on a database server computer are specified below for use with this invention. The use of these methods increases the difficulty of cryptanalyzing the data (i.e., BPM's) held on a database server computer.

1) Dummy Columns

Meaningless columns can be added to a BPM and "1s" and "0's" can be added on any basis whatsoever, e.g., randomly, or as a function of the number of "1's" in the current row.

No codebook updates need to be provided to end user client workstations for the sake of maintaining access to the information since the data introduced is useful only because it makes the BPM's more difficult to cryptanalyze. Nevertheless, it may well be useful to send out "dummy column codebook updates" to prevent an adversary from being able to make a distinction between "real" and "dummy" BPM updates.

2) Dummy Rows

Meaningless (or erroneous) rows of information can be added to the database. End-user client workstations would need to be able to recognize the existence of dummy rows and ignore them in performing database operations. A preferred method for handling dummy rows is to provide those BPM's which have dummy rows with "dummy row marker columns". All dummy rows would also have a "1" in at least one of the "dummy marker columns". End-user client workstations authorized to access a BPM containing dummy rows would be provided with codebook information for the dummy column markers in the BPM. Database operations would then first check whether a particular row had any dummy column markers and ignore the row if this were the case.

3) Column Splitting

Property frequencies can be leveled using this method. For example, if it is known that 80% of all soldiers are men, then 4 columns can be used to record the property "male" to every 1 column used to record the property "female". Multiple columns can be used for properties even when there is no variation in the frequencies of the various properties for a given attribute in order to skew the actual statistical frequencies or simply further obfuscate the relationship between properties and columns.

In one of the most extreme forms of column splitting, each column may be used for no more than a single instance of a property occurrence. If a second instance of a property needs to be added to a BPM, then a new column must be allocated for it. To give an example, consider the following four records:

| Martha, | Female, | Blue Eyes, | 5'6", 120 lbs. |
| George, | Male, | Blue Eyes, | 6'1", 190 lbs. |
| George, | Male, | Brown Eyes, | 5'6", 190 lbs. |
| Lisa, | Female, | Brown Eyes, | 5'6", 120 lbs. |

These records could be represented with the following BPM (or some column-wise permutation of this BPM) which has been annotated to make the meanings of the columns clear:

Martha F Blue 5'6" 120 George M Blue 6'1" 190

George M Brown 5'6" 190 Lisa F Brown 5'6" 120 lbs.

1 1 1 1 1 0 0 0 0 0 0 0 0 0 0 0 0 0 0 0 0

0 0 0 0 0 1 1 1 1 1 0 0 0 0 0 0 0 0 0 0 0

0 0 0 0 0 0 0 0 0 0 1 1 1 1 1 0 0 0 0 0 0

0 0 0 0 0 0 0 0 0 0 0 0 0 0 0 1 1 1 1 1

From an information theoretic point of view, a BPM constructed in this manner provides a tremendously high degree of secrecy. It should be noted that query operations can still be performed on this BPM.

A trusted key server could be granted access to monitor the frequencies of various properties belonging to the various attributes and for directing the splitting of columns when certain thresholds are exceeded. Alternatively, column splitting could be coordinated from the end user client workstations since they would of course be able to calculate frequencies for those properties they are granted access to.

4) Column Offsets

All index numbers in the compressed representation of a BPM can be given an offset from their actual values. Different BPM's can be given different offsets. Random (or otherwise meaningless) data can be generated to fill the columns whose index values are less than the offset applied to a given BPM. Offsets can be done according to any mathematical formula that allows the original values to be easily computed, so that the original index values can be used in database operations. To give a very simple example, referring to FIG. 4 once again, if an offset of +5 is applied to the single index compression scheme representation of the BPM, then the BPM could be represented as follows:

(6,12,17,22,30,37,39,46,49,57,61,66,73,76,84,89,92,98, 104,107,116,117,122,127) Dim(11,26).

End-user client workstations authorized to access a given BPM having an offset must be securely distributed the offset information for that BPM. Calculations involving the BPM must also be adjusted to take into account the BPM's offset and must obviously discard or ignore data in columns whose index values are less than the offset. If an architecture with one or more trusted key servers is used with this invention, it may be noted that offset information for any given BPM need not be sent via the same trusted key server which is used to distribute codebook updates for the BPM. The offset information can either be distributed by a different trusted key server or directly between end-user client workstations. Database commands issued from an end user client workstation to a database server would then also include column offset information.

5) Encryption of Compressed Sparse Matrices Dimension Information

Additional security can be easily provided by encrypting just the dimensions of the compressed BPM's used by this invention. The compression of sparse matrices using the bit map, single index and double index compression schemes all require that the dimensions of the matrices be specified. Other sparse matrix compression schemes can also require that the dimensions of a matrix be specified in order to compress it. Encrypting just the data specifying the dimensions of a compressed sparse matrix enhances the cryptographic security of the encoded matrix at virtually no performance cost.

For example, in the single index compression scheme, a BPM A consists of just two components: 1) a 2-tuple specifying the dimensions of the BPM; and 2) a vector v specifying the locations of the non-zero elements in the BPM. Under the single indexing method the elements of A are ordered sequentially in one dimension only; knowing the number of columns in A is therefore crucial to interpreting which column and row of A each element in vector v represents. While the BPM's of a SPARCOM database will generally be very large, for illustrative purposes FIG. 11 shows the straightforward ordering of the locations of the elements in a 5×8 matrix and gives the single index scheme representation of an example BPM of the same dimensions.

In the example of FIG. 11 we can see that without knowing that the dimension of the matrix is Dim(5,8) (and in particular that the number of columns equals 8) it would be impossible to know, for instance, that vector v's fourth element which has a value of 13 means that BPM A has a "1" at coordinate (2,5). Likewise, it would also be impossible to know that v's tenth element which has a value of 37 means that A has a "1" at coordinate (5,5). Of course, not knowing that both coordinates (2,5) and (5,5) are "ones" in A also means not knowing that both the second and fifth records of BPM A have a property in common, i.e., whatever property column five of the BPM stands for.

Any encryption scheme (preferably a strong one) may be used to encrypt the dimensions of the compressed sparse matrices held in a database repository.

6) BPM Column Permutations

Permuting the columns of a BPM is a way of changing the keys needed to access the information. Column permutations can be accomplished by many methods. One preferred method for accomplishing this is for the owner of the table to perform this task on his or her end-user client workstation using the following steps:

Step 1) Download the table (BPM) to his or her end-user client workstation.

Step 2) Randomly permute the columns. (A program using a psuedo-random number generator can be used to assist in the selection of the ordering of columns; alternatively, a program can be used in conjunction with a physical source of randomness to assist in the selection of the column ordering.)

Step 3) Delete the original BPM on the database server computer.

Step 4) Upload the newly permuted BPM to the database server computer replacing the original BPM.

After a BPM A is permuted in this fashion it is of course necessary to provide codebook updates to those users who are authorized to have access to BPM A's data.

If the universal numbering scheme for columns specified above to facilitate natural join operations is used, then other BPM's which have properties in common with BPM A must also have their columns permuted in a manner consistent with the property-column number assignments of BPM A. It is clear that a chain of BPM permutations is then required to maintain property-column number consistency depending on the web of common properties that exist amongst the BPM's of a database.

VARIATIONS ON THE DISTRIBUTED DATABASE ARCHITECTURE OF THE INVENTION

The distributed database architecture initially described for this invention is given in FIG. 6A. Figures specifying other distributed database architectures are given in FIG. 6B, FIG. 10A and FIG. 10B. It is clear that there are numerous other ways of distributing the components of the distributed database architecture of this invention that are consistent with the invention specified herein. One additional configuration of note is to have individual end-user workstations house portions of some or all of the SPARCOM data available located on the network. Under this scenario, end-user workstations would be accessing SPARCOM database information located on other end-user workstations instead of on one or more distinct database-only SPARCOM servers.

DATABASE PROPERTY INDEPENDENCE

An useful benefit of the current invention is the fact that it provides property independence to a database. The compressed BPM's used by this invention record only that a property exists or that it does not, while the codebooks on the end user client workstations actually specify the contents of each property for which they have access. The codebook entries for a given property (i.e., a BPM column number, or a set of column numbers if "column splitting" has been used)

on different end user client workstations can contain different interpretations of the given property. For instance, two different codebooks referring to the same column within a given BPM can contain entries with equivalent meanings in different natural languages, e.g., one in English and one in Japanese. In contrast to attribute oriented databases, the compressed BPM data used by this invention is completely without natural language bias. The property independence provided by this invention can also be applied to more complex data objects such as images, video and sound, as well as to pointers for these types of objects. Two different codebooks referring to the same BPM can contain entries even having different data types for the same property, e.g., one codebook could specify a text value for a given property while a second codebook could specify an audio or image file for the same BPM column number.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for secure storage of data comprising:
    a database having a semantically encrypted store of data;
    a database mechanism for performing database operations with semantically encrypted data without requiring decryption of the data, said database mechanism connected with said database; and
    an access mechanism connected to the database mechanism for obtaining data from the database mechanism.

2. An apparatus as described in claim 1 wherein the access mechanism includes an encryption/decryption mechanism connected to the database mechanism for receiving the decrypted data, encrypting the data and providing it to the database, and for receiving encrypted data from the database mechanism, and decrypting it.

3. An apparatus as described in claim 2 wherein the semantically encrypted data is a property-oriented positional Q-code.

4. An apparatus as described in claim 3 wherein the property-oriented positional q-code comprises sparse binary matrices.

5. An apparatus as described in claim 4 wherein the access mechanism includes an end-user client workstation having a user CPU and a workstation memory connected to the CPU, and wherein the encryption/decryption mechanism includes a code book stored in the memory and a software program in the memory which accesses and updates the code book.

6. An apparatus as described in claim 5 including a database server computer having the database mechanism and the database.

7. An apparatus as described in claim 6 wherein the database mechanism includes a server CPU and a server memory connected to the server CPU, said server memory having said database.

8. An apparatus as described in claim 7 wherein the server memory includes a database command storage buffer, and a database response storage buffer.

9. An apparatus as described in claim 8 wherein the server computer includes a server communication port connected to the server memory and the server CPU.

10. An apparatus as described in claim 9 wherein the workstation includes a workstation communications port connected to the server communications port and to the workstation CPU and the workstation memory, an input port and an output port, both of which are connected to the workstation memory and the workstation CPU and the workstation communications port.

11. An apparatus as described in claim 4 wherein the property-oriented positional Q-code uses dummy columns, dummy rows, column splitting, column offsets, encryption of compressed sparse matrix dimension information or BPM column permutations to increase the security of the property-oriented positional Q-code.

12. An apparatus for secure storage of data comprising:
    a database having fully indexed data;
    a database mechanism for performing operations on or with fully indexed data having index information which permits access and interpretation of the fully indexed data, said database mechanism connected to said database; and
    an access mechanism connected to the database mechanism for obtaining data from the database mechanism.

13. An apparatus for data storage comprising:
    a database having a semantically represented store of data;
    a database mechanism for performing database operations with the semantically represented data, said database mechanism connected with said database; and
    an access mechanism connected to the database mechanism for obtaining data from the database mechanism such that the access mechanism provides different users with different representations of the semantically encrypted data.

14. An apparatus as described in claim 13 wherein the access mechanism provides different users with different natural language translations of the semantically represented data.

15. An apparatus as described in claim 13 wherein the access mechanism provides a sight-impaired person with an audio representation of the semantically represented data.

16. A method for secure storage of data comprising the steps of:
    storing semantically encrypted data in a memory;
    performing database operations with semantically encrypted data from the memory without requiring decryption of the data; and
    obtaining data from the memory.

* * * * *